United States Patent [19]

Nield et al.

[11] 4,197,235

[45] Apr. 8, 1980

[54] POLYAMIDE COMPOSITIONS

[75] Inventors: Eric Nield, Hertford; Sidney R. D. Oldland, Welwyn Garden City, both of England

[73] Assignee: Imperial Chemical Industries Limited, London, England

[21] Appl. No.: 934,260

[22] Filed: Aug. 16, 1978

[30] Foreign Application Priority Data

Aug. 30, 1977 [GB] United Kingdom ............... 36154/77

[51] Int. Cl.² .......................... C08K 5/43; C08K 5/41; C08K 5/34
[52] U.S. Cl. ............................................ 260/45.8 NT
[58] Field of Search ................ 260/45.8 NT; 428/921; 544/199, 196; 252/8.1

[56] References Cited

U.S. PATENT DOCUMENTS

| | | | |
|---|---|---|---|
| 2,032,605 | 3/1936 | Whitehead | 428/921 |
| 3,660,344 | 5/1972 | Michael et al. | 260/45.8 NT |
| 3,663,495 | 5/1972 | Michael et al. | 260/37 N |
| 3,819,518 | 6/1974 | Endler | 252/8.1 |
| 3,839,239 | 10/1974 | Godfried | 252/8.1 |
| 3,855,138 | 12/1974 | Roth | 252/8.1 |
| 4,028,333 | 6/1977 | Lindvay | 260/45.8 NT |

FOREIGN PATENT DOCUMENTS

| | | | |
|---|---|---|---|
| 557874 | 5/1958 | Canada | 544/199 |
| 1694254 | 6/1971 | Fed. Rep. of Germany . | |
| 2031693 | 1/1972 | Fed. Rep. of Germany . | |
| 2364942 | 9/1977 | France . | |

*Primary Examiner*—V. P. Hoke
*Attorney, Agent, or Firm*—Cushman, Darby & Cushman

[57] ABSTRACT

A fire retardant polyamide composition containing at least 10% by weight of a polyamide containing a major proportion of nylon 66 or nylon 6 units and from 1 to 90%, preferably 5 to 25% by weight of a salt derived from melamine or a melamine derivative containing at least one —NH₂ group, the salt being chosen from at least one of the borate, halide, sulphamate and demi-sulphate.

10 Claims, No Drawings

POLYAMIDE COMPOSITIONS

This invention relates to fire retardant polyamide compositions containing salts derived from melamine.

British patent specification No. 1 204 835 discloses fire retardant polyamide compositions containing from 0.5 to 25% by weight of a melamine compound selected from the group comprising melamine, melam and various specified melamine derivatives. Compositions have now been developed which show improved fire retardancy to the compositions disclosed in the aforementioned patent specification.

Accordingly there is provided a fire retardant polyamide composition comprising at least 10% by weight of a polyamide containing a major proportion by weight of units derived from hexamethylene adipamide or caprolactam characterised in that the composition contains from 1 to 90% by weight of a salt derived from melamine or a melamine derivative containing at least one —NH$_2$ group wherein the salt is selected from at least one of the borate, halide, sulphamate and demi-sulphate.

By the term "demi-sulphate" is meant the sulphate containing a half mole of sulphuric acid per mole of melamine $$(C_3H_6N_6 \cdot \tfrac{1}{2} H_2SO_4).$$

The compositions of the invention have an excellent level of fire retardancy and enable fire retardant polyamide compositions to be obtained more cheaply than many of the currently available compositions which employ halogen containing or phosphorus containing compounds. They may readily be compounded into polyamides at melt temperatures as high as 300° C. and produce less corrosive fumes than many of the materials previously used or suggested.

Compositions which are suitable for direct injection moulding into shaped articles or for forming fibres, preferably contain about 5 to 25% by weight of at least one of the specified salts and at least about 50% of the polyamide. However, the compositions according to the invention may also be produced in the form of a masterbatch which can subsequently be mixed with other polyamide compositions not containing the fire retardant. This mixture of compositions may then be injection moulded. This well-known approach has some advantages, for example in reducing the number of varieties or grades that might otherwise be required by the fabricator. When such a masterbatch approach is used the concentration of polyamide in the masterbatch need only be sufficient to wet the fire retardant additive and prevent a significant quantity of the additive being present in the form of dust. Preferably the fire retardant should be thoroughly dispersed in the polyamide. This concentration of polyamide required for this may be as low as 10% by weight of the masterbatch composition. Conveniently, the masterbatch is supplied in the form of a granule or pellet having sufficient strength in the granule to be handled, transported and blended with other polyamide compositions without significant break down of the granules occurring. The chemical nature of the polyamide in the granule of fire retardant composition need not necessarily be the same as the polyamide with which it is to be blended.

The salts derived from melamine include its derivatives such as melam, melem and melon, or substituted melamines provided that they contain at least one —NH$_2$ group on the melamine for formation of the salts.

The salts which have been found most useful are the borates, bromides, sulphamates and demi-sulphates. Other salts such as the sulphates containing more than ½ mole of sulphuric acid in the molecule, phosphates and oxalates show an improvement in burning performance over the use of melamine but suffer from the disadvantage that they cause an unacceptable level of degration of the polyamide when they are compounded together at the melting temperatures of the polyamides, particularly in the case of the higher melting polyamides such as poly(hexamethylene adipamide).

The effectiveness of the demi-sulphate is particularly surprising when compared with the sulphate containing one mole of sulphuric acid per mole of melamine. Japanese Patent Publication No. 52 027457 discloses the use of melamine sulphate as a fire retardant for polyamides. The method for preparing the sulphate disclosed in the specification gives rise to a compound of empirical formula $$C_3H_6N_6 \cdot H_2SO_4.$$

When this is used as a flame retardant with nylon 66 severe degradation is experienced during the compounding operation. The salts should be sufficiently stable to enable them to be compounded into molten polyamides without decomposition or volatilisation. In general they should be stable to temperatures of at least 200° C. when used in the lower melting point polyamides or up to at least 300° C. for use in the higher melting point polyamides such as nylon 66.

The salts are readily prepared in aqueous solution from which they may be crystallised. For example, the borate salts may readily be prepared from aqueous solutions of melamine or the derivatives specified and a solution of boric oxide or boric acid. The solubility of the melamines is not very high and it is preferable to dissolve the reaction materials in hot or boiling water. The borate salts crystallise readily on cooling and can be isolated readily in a sufficiently pure state by filtration and drying. The sulphamate is prepared by a similar method. In preparing the demi-sulphate the quantity of sulphuric acid used must be kept below the level which results in the sulphate of melamine having an empirical formula $$C_3H_6N_6 \cdot H_2SO_4.$$

This level is best determined experimentally from analysis of the product prepared under a given set of conditions.

The specified salts have been found to be suitable fire retardants for polyamides containing a major proportion of either units derived from hexamethylene adipamide or caprolactam. Thus the suitable polymers are homopolymers of nylon 66 and nylon 6 and copolymers of these materials containing not more than 50% by weight of units other than nylon 66 or nylon 6. These other units may be, for example, of nylon 6.9 or 6.10. The preferred materials are the homopolymers of nylon 66 and nylon 6 and copolymers of nylon 66 with nylon 6.

In addition to the polyamide and the specified salts the compositions may contain any of the auxiliary materials which are known for use in polyamide compositions. These include heat and light stabilisers, pigments, lubricants, mould release agents and fillers. Fillers that act as wicks such as reinforcing fibrous fillers, notably glass, should be avoided because these may seriously reduce the burning performance.

The specified organic salt may be supplemented by the addition of other known fire retardants and synergists but in general satisfactory results can be achieved by the use of one or more of the salts without the need for additional fire retardant additives or synergists. The most suitable additional materials are hydrated materials such as hydrated alumina or the hydrated zinc borates.

A major advantage of the invention is that acceptable burning properties can be obtained with considerably lower total concentrations of fire retardant additives than the more conventional halogenated systems. This results in the further advantage that the levels of tensile strength obtained from the compositions show little or no reduction over that obtained from the same compositions not containing the fire retardants. In this respect they compare favourably with compositions based on halogenated additives and synergistic metal oxides.

Yet another advantage arises from the fact that under burning conditions the compositions of the invention cause significantly less corrosion than halogen-based systems.

The compositions of the invention are suitable for moulding general purpose electrical components or other components where fire retardancy is important.

The invention is further described with reference to the following Examples.

EXAMPLE 1

Boric oxide (209 g) was dissolved in water (1250 ml) at 90° and poured with stirring into a hot solution (90° C.) of melamine (126 g) in water (3900 ml). The mixed solution was allowed to cool and the salt filtered off and dried in a vacuum oven at 120°. A yield of 245 g was obtained.

EXAMPLE 2

Boric oxide (105 g) was dissolved in water (300 ml) at 90° and poured with stirring into a hot solution (90° C.) of melamine (126 g) in water (3900 ml). The mixed solution was allowed to cool and the salt filtered off and dried in a vacuum oven at 120°. A yield of 242 g was obtained.

EXAMPLE 3

Boric acid (266 g) was dissolved in water (1250 ml) at 90° C. and poured with stirring into a hot solution (90°) of melamine (126 g) in water (3900 ml). After cooling the salt was filtered off and dried in a vacuum oven at 120° C. A yield of 254 g was obtained.

EXAMPLE 4

The products of Examples 1 and 2 were compounded with nylon 66 containing 0.5% by weight of zinc stearate using a 38 mm single screw extruder at a temperature of about 270° C. The product was extruded as lace and chopped into granules. The granules were injection moulded into specimens for testing according to Underwriters Laboratories Test Standard UL94. The results, measured on conditioned samples 3 mm in thickness, are recorded in the following table in comparison with a control sample containing no salt.

TABLE I

| Composition | Total Flame Out Time (10 ignitions) (sec) | Average Flame Out Time (sec) | |
|---|---|---|---|
| | | 1st Ignition | 2nd Ignition |
| 1. Nylon 66 containing 0.5% by weight zinc stearate | 176.5 | 13.3 | 22 |
| 2. As above containing 5% by weight of salt of Example 2 | 92.5 | 5.2 | 13.2 |
| 3. As 1 containing 10% by weight of salt of Example 2 | 69 | 5.7 | 8.1 |
| 4. As 1 containing 10% by weight of salt of Example 1 | 37.9 | 3.1 | 4.5 |

EXAMPLE 5

Melamine (126 g) was dissolved in water (4000 ml) at 90° and concentrated sulphuric acid (148 g) in water (250 ml) was added with stirring. When cool the melamine sulphate was filtered off and dried in a vacuum oven at 120° C. A yield of 165 g was obtained. This material was found to have an empirical formula of $$C_3H_6N_6 \cdot \tfrac{1}{2}H_2SO_4.$$

125 g of this material was dry blended with 12.5 g zinc stearate and 417 g of nylon 66 powder by shaking in a polythene bag. Further nylon 66 was added to the bag to bring the total weight of contents up to 3 kg. After further shaking the blend was extruded in a 38 mm 'Plaston' single screw extruder with a screw speed of 80 rpm and an indicated barrel temperature which varied between 295° C. and 310° C. A white lace was extruded, cooled in water and cut into chip. The intrinsic viscosity of the polyamide chip showed no significant change with respect to the powder used in the blend.

An identical composition was evaluated to determine the corrosivity of the fumes produced from the burning composition. The preferred test method determines the percentage change in electrical resistance of a piece of fine copper wire placed in contact with fumes generated from a sample of the material under test. The test used has been published as UTE C20453 by the Union Technique de l'Electricite. Using this test the relative change in resistance over 6 cycles (each of 2 hours at 55° C. followed by 2 hours at 40°) was as follows:

| Cycle | Relative change in resistance from initial value ΔR/R (%) |
|---|---|
| 1 | 1.4 |
| 2 | 0.5 |
| 3 | 0.4 |
| 4 | 0.3 |
| 5 | 0.3 |
| 6 | 0.3 |

COMPARATIVE EXAMPLE A

The procedure disclosed in Japanese Patent Publication No. 52 027457 for preparing melamine sulphate was followed. Melamine (126 g) was gradually added to 50% w/w aqueous sulphuric acid (500 g) the solution was maintained for 1 hour at 60°–70° with stirring and the reaction product filtered off, washed with water and dried in a vacuum oven at 100° C. The material was found to have an empirical formula of $C_3H_6N_6.H_2SO_4$.

150 g of this material, 15 g zinc stearate and 500 g of the nylon 66 powder used in Example 5 were dry blended in a polythene bag before being made up to 3 kg with the nylon 66 and further blended. The blend was extruded under the conditions given in Example 5. The lace emerging from the extruder was dark brown in colour and was found to have seriously degraded from an examination of the intrinsic viscosity of the product.

COMPARATIVE EXAMPLE B

For confirmation of the results obtained on comparison between Example 5 and Comparison Example A the procedures disclosed therein were repeated. Essentially the same results were obtained as indicated by the following intrinsic viscosity measurements on chips of the extruded composition.

| Sample | |
|---|---|
| Nylon 66 containing 5% melamine demi-sulphate | 1.05 |
| Nylon 66 containing 5% melamine sulphate (made according to Japanese patent publication 52 027457) | 0.77 |
| Nylon 66 control. | 0.01 |

EXAMPLE 6

Further samples of the melamine demi-sulphate made according to the procedure of Example 5 were dry blended with nylon 6 and a copolymer of nylon 6 and nylon 66 as detailed in Table II. Each blend contained 187.5 g melamine demi-sulphate (prepared according to Example 5) and the specified nylon to give a total weight of 2.5 kg. Controls containing no melamine demi-sulphate were also prepared. The dry blends were compounded in a 'Plaston' extruder and extruded as lace. The lace was cooled under water and cut into chip. Test pieces were injection moulded using a Stubbe SKM51 injection moulding machine.

TABLE II

| Run No. | Polyamide | Melamine demi-sulphate concentration (%) | Extrusion Temperature (°C.) | Intrinsic Viscosity of chip |
|---|---|---|---|---|
| 1 | Nylon 66:6 90:10 copolymer | 0 | 285 | 0.87 |
| 2 | Nylon 66:6 90:10 copolymer | 7.5 | 285 | 1.00 |
| 3 | Nylon 6 homopolymer | 0 | 250 | 0.84 |
| 4 | Nylon 6 homopolymer | 7.5 | 250 | 0.82 |

The properties obtained from the mouldings of these compositions are recorded in Table III. The fire retardancy performance was measured according to the Underwriters Laboratories Standard UL94 using the Vertical Burning Test on samples 1.5 mm thick which had been aged for 48 hours at 50% relative humidity or aged at 70° C. for 7 days. The impact strength was measured on notched samples using the Charpy Impact Test of DIN 53453 with a notch radius of 0.25 mm. The tensile strength was measured according to ASTM D638-72.

TABLE III

| | Burning Performance | | | | | |
|---|---|---|---|---|---|---|
| Run No. | Average Burn Time (sec) | Maximum Burn Time (sec) | UL94 Rating | Tensile Strength $MN/m^2$ | Impact Strength $KJ/m^2$ IS($\frac{1}{4}$) | Appearance of Moulding |
| 1 | 4 | 7 | V2 | 79.5 | 7.9 | — |
| 2 | 0 | 0 | V0 | 80.3 | 4.1 | Grey |
| 3 | 0.1 | 5 | V2 | 86.7 | 5.0 | — |
| 4 | 0 | 0 | V0 | 80.9 | 3.0 | White |

EXAMPLE 7

Melamine (126 g) was dissolved in water (4 liters) at 90° C. and sulphamic acid (194 g) in 1 liter of water) was added slowly with stirring. A white product separated out. The product was filtered off and dried under vacuum at 120° C. A yield of 205 g was obtained.

This product was compounded into a 90:10 nylon 66.6 copolymer to give a concentration of 5% by weight of the sulphamate. Samples injection moulded from the pelletised product were found to have a Limiting Oxygen Index of 33 to 33.5 compared with about 22 for the polymer itself. The intrinsic viscosity of the polymer in the moulding was found to have dropped to 0.73 compared to 0.86 in the chip and 0.87 for the polymer before compounding.

In comparison with the composition of Example 5 containing 5.0% melamine demi-sulphate this composition has an improved burning performance (Limiting Oxygen Index of 30.5-31 for composition of Example 5) but a greater tendency to decompose during compounding and processing.

EXAMPLE 8

Melamine (63 g) was slowly added to a hot (80° C.) solution of hydrobromic acid (121.5 g) in water (1100 ml) and the solution allowed to cool. The crystals of melamine bromide were filtered off and dried in a vacuum oven at 120°. A yield of 72 g was obtained. The product was compounded into nylon 66 to give a concentration of 5% by weight of melamine bromide. A sample of the extrudate was ignited and was found to extinguish almost immediately the flame was removed.

EXAMPLE 9

A masterbatch containing 73% by weight of melamine demi-sulphate and 27% of a 73:27 copolymer of nylon 66:6 was prepared by intimate melt mixing using a Buss Koneader Model (PR 46). The masterbatch was produced in the form of a chip. The chip was blended with nylon 66 powder to give the concentrations of melamine demi-sulphate recorded in the Table below. Samples from the composition were injection moulded to give test pieces for the Vertical Burning Test of the UL94 Standard. The burning performance of the as-moulded samples is recorded in Table IV.

TABLE IV

| Melamine Demi-Sulphate Concentration (%) | Burning Performance | | | |
|---|---|---|---|---|
| | 1st Burn (sec) | | 2nd Burn (sec) | |
| | Average Time | Maximum Time | Average Time | Maximum Time |
| 0 | 2.6 | 5 (BD)* | 1 | 6(BD) |
| 2.5 | 0 | 0(BD) | 0 | 0(SE) |

TABLE IV-continued

| Melamine Demi-Sulphate Concentration (%) | Burning Performance | | | |
|---|---|---|---|---|
| | 1st Burn (sec) | | 2nd Burn (sec) | |
| | Average Time | Maximum Time | Average Time | Maximum Time |
| 5.0 | 0 | 0(SE) | 0 | 0(SE) |
| 7.5 | 0 | 0(SE) | 0 | 0(SE) |
| 10.0 | 0 | 0(SE) | 0 | 0(SE) |

BD = Burning Drips
SE = Self Extinguishing

COMPARATIVE EXAMPLE C

Melamine (126 g) was dissolved in water (3900 ml) at 90° C. and orthophosphoric acid (111.4 g) in water (200 ml) added with stirring and the solution allowed to cool. The melamine phosphate crystals were filtered off and dried in a vacuum oven at 120°. A yield of 186.5 g was obtained.

The melamine phosphate obtained was compounded with nylon 66 containing 28% by weight of glass fibre using a single screw extruder at a temperature of about 270° C. to give a composition containing 10% by weight of melamine phosphate. A similar composition was prepared which contained, in addition to the above ingredients, 5% by weight of 'Dechlorane' 515 supplied by the Hooker Chemical Company. Results measured on 1.6 mm thick samples according to the procedure of Test Standard UL94 showed continuously. The second composition gave average total burn times of 31 seconds. Although this is an improved performance in comparison with the sample containing 'Dechlorane' 515 it is not an acceptable burning performance.

We claim:

1. A fire-retardant polyamide composition comprising at least 10% by weight of a polyamide containing a major proportion by weight of hexamethylene adipamide or caprolactam units, wherein said polyamide composition contains from 1 to 90% by weight of a salt derived from melamine or a melamine derivative salt containing at least one $-NH_2$ group wherein the salt is selected from at least one of the borate, sulphamate and demi-sulphate said salt being sufficiently stable to enable it to be compounded into said polyamide in the molten state without decomposition or volitilisation.

2. A polyamide composition according to claim 1 wherein the composition contains from 5 to 25% by weight of the salt and at least 50% by weight of the polyamide.

3. A polyamide composition according to claim 1 wherein the salt is a salt of melamine, melam, melem or melon.

4. A polyamide composition according to claim 1 wherein the polyamide is a homopolymer of hexamethylene adipamide or hexamethylene caprolactam or a copolymer of hexamethylene adipamide and hexamethylene caprolactam.

5. A polyamide composition according to claim 1 wherein the salt is melamine demi-sulphate of empirical formula

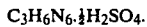

6. A polyamide composition according to claim 1 wherein the salt is melamine sulphamate.

7. A polyamide composition according to claim 1 wherein the salt is melamine borate.

8. A polyamide composition according to claim 2 having a burning performance as measured on a sample of 1.5 mm thickness using the Vertical Burning Test of Underwriters Laboratories Standard UL94 of VO.

9. A polyamide composition according to claim 1, wherein said melamine derivative is selected from the group consisting of melam, melem, melon and substituted melamines.

10. A polyamide composition according to claim 9, wherein said melamine derivative is soluable in water and said salt is capable of being crystallized from an aqueous solution of said derivative.

* * * * *